US012431647B2

(12) United States Patent
Hsu et al.

(10) Patent No.: US 12,431,647 B2
(45) Date of Patent: Sep. 30, 2025

(54) CONNECTION MODULE AND ELECTRONIC DEVICE

(71) Applicant: Getac Technology Corporation, New Taipei (TW)

(72) Inventors: Wan-Lin Hsu, Taipei (TW); Juei-Chi Chang, Taipei (TW); Kun-Cheng Lee, Taipei (TW)

(73) Assignee: Getac Technology Corporation, New Taipei (TW)

( * ) Notice: Subject to any disclaimer, the term of this patent is extended or adjusted under 35 U.S.C. 154(b) by 367 days.

(21) Appl. No.: 18/155,034

(22) Filed: Jan. 16, 2023

(65) Prior Publication Data

US 2023/0238726 A1 Jul. 27, 2023

Related U.S. Application Data

(63) Continuation-in-part of application No. 17/589,296, filed on Jan. 31, 2022, now Pat. No. 11,955,743.

(60) Provisional application No. 63/302,986, filed on Jan. 25, 2022.

(30) Foreign Application Priority Data

Jan. 21, 2022 (CN) ......................... 202210071620.9
Nov. 25, 2022 (CN) ......................... 202211497913.X

(51) Int. Cl.
*H01R 12/91* (2011.01)
*H01R 12/71* (2011.01)
*H01R 13/631* (2006.01)
*H01R 24/60* (2011.01)

(52) U.S. Cl.
CPC ........... *H01R 12/91* (2013.01); *H01R 12/716* (2013.01); *H01R 13/6315* (2013.01); *H01R 24/60* (2013.01)

(58) Field of Classification Search
CPC .. H01R 13/6315; H01R 12/716; H01R 12/91; H01R 12/724; H01R 12/523; H01R 12/752; H01R 12/62; H01R 12/722; H01R 12/732; H01R 12/7047; H01R 12/79
USPC ...................................... 439/660, 74, 67, 69
See application file for complete search history.

(56) References Cited

U.S. PATENT DOCUMENTS 2,025,619 A * 12/1935 Scotncy .................. H05K 7/06 361/803
5,362,243 A * 11/1994 Huss .................... H05K 9/0066 361/749
5,370,540 A * 12/1994 Kobayashi ............ H01R 12/58 439/78

(Continued)

FOREIGN PATENT DOCUMENTS

CN 108963544 A 12/2018
CN 112712828 A 4/2021

(Continued)

*Primary Examiner* — Marcus E Harcum
(74) *Attorney, Agent, or Firm* — Cooper Legal Group, LLC

(57) ABSTRACT

A connection module and an electronic device are provided. The connection module includes: two floating plates formed by a board body of a main circuit board; and at least two connectors respectively fixed to the floating plates. The board body is provided with at least one disconnecting notch, the board body is separated by the disconnecting notch into the two floating plates arranged side by side at an interval and floatable using the disconnecting notch, and the main circuit board is a hard circuit board.

20 Claims, 16 Drawing Sheets

(56) References Cited

U.S. PATENT DOCUMENTS

| | | | | | |
|---|---|---|---|---|---|
| 5,827,076 | A * | 10/1998 | Chen | H01R 12/7005 | 439/590 |
| 6,062,877 | A * | 5/2000 | Makino | H01R 12/7005 | 439/79 |
| 6,368,116 | B1 * | 4/2002 | Tabata | H01R 12/79 | 439/493 |
| 6,595,786 | B2 * | 7/2003 | Horiuchi | H01R 13/6315 | 439/74 |
| 6,935,868 | B1 * | 8/2005 | Campini | G06F 1/186 | 361/748 |
| 7,214,074 | B2 * | 5/2007 | Osada | H01R 12/712 | 439/892 |
| 7,252,516 | B1 * | 8/2007 | Zhang | G06F 1/1658 | 439/67 |
| 7,649,751 | B2 * | 1/2010 | Nguyen | H01R 12/7005 | 361/752 |
| 7,740,489 | B2 * | 6/2010 | Trout | H01R 12/523 | 439/74 |
| 8,308,491 | B2 * | 11/2012 | Nichols | H01R 12/73 | 439/67 |
| 10,038,262 | B1 * | 7/2018 | Behziz | H01R 12/7082 | |
| 10,095,280 | B2 * | 10/2018 | Bettiga | G06F 1/185 | |
| 10,454,194 | B1 | 10/2019 | Phillips et al. | | |
| 10,547,134 | B1 * | 1/2020 | Lee | H01R 24/60 | |
| 10,566,722 | B2 * | 2/2020 | Lee | H01R 12/62 | |
| 11,316,290 | B2 * | 4/2022 | Kliever | H01R 12/523 | |
| 2002/0072255 | A1 * | 6/2002 | Leman | H01R 12/721 | 439/61 |
| 2005/0170675 | A1 | 8/2005 | Takada | | |
| 2011/0249419 | A1 * | 10/2011 | Sun | H01R 12/7082 | 361/803 |
| 2013/0005193 | A1 | 1/2013 | Tsai | | |
| 2015/0194768 | A1 * | 7/2015 | Little | H01R 24/60 | 439/607.37 |
| 2017/0099735 | A1 * | 4/2017 | Takai | H05K 9/0058 | |
| 2018/0138646 | A1 * | 5/2018 | Chuang | H01R 12/52 | |
| 2020/0028292 | A1 | 1/2020 | Lee et al. | | |
| 2021/0376527 | A1 | 12/2021 | Cheng et al. | | |
| 2022/0181811 | A1 * | 6/2022 | Liu | H01R 12/724 | |

FOREIGN PATENT DOCUMENTS

| | | | |
|---|---|---|---|
| CN | 109997280 | B | 5/2021 |
| CN | 110611188 | B | 1/2022 |
| TW | I669862 | B | 8/2019 |

* cited by examiner

CONNECTION MODULE AND ELECTRONIC DEVICE

CROSS-REFERENCE TO RELATED PATENT APPLICATION

This application is a continuation-in-part application of the U.S. application Ser. No. 17/589,296, filed on Jan. 31, 2022 and entitled "CONNECTION MODULE AND THINNING METHOD THEREOF", the contents of which are incorporated herein by reference in their entireties.

This application also claims the benefit of priorities to China Patent Application No. 202210071620.9 filed on Jan. 21, 2022 and No. 202211497913.X filed on Nov. 25, 2022 in People's Republic of China, and to the U.S. Provisional Patent Application Ser. No. 63/302,986 filed on Jan. 25, 2022. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present invention relates to a connection module and an electronic device, and more particularly to a connection module and an electronic device including said connection module.

BACKGROUND OF THE INVENTION

Connectors disposed on circuit boards and pluggable devices plugged to connectors suffer from a drawback of the incapability of effectively improving transmission speeds. Thus, in order to improve the transmission speed, the Inventor of the present invention plans to provide at the same time a plurality of (two or more) counterpart connectors on a pluggable device, and to correspondingly provide at the same time a plurality of (two or more) connectors on a circuit board. Although the approach above achieves the object of improving the transmission speed, another issue of the need for precise alignment between the connectors and the counterpart connectors is also induced.

To enable precise alignment between the connectors and the counterpart connectors, a current approach is to use a flexible circuit board for disposing the connectors, such that the connectors are allowed to float along with the flexible circuit board by means of the flexibility of the flexible circuit board.

The current approach of using such a flexible circuit board achieves the effect of precise alignment as required. However, in practice, a guide frame is additionally needed to guide the floating, thereby resulting in an increased overall height and hence a failure in satisfying current thinning requirements.

SUMMARY OF THE INVENTION

In response to the above-referenced technical inadequacies, the present invention provides a connection module and an electronic device, so as to address an issue of a conventional connection module not satisfying thinning requirements.

In one aspect, the present invention provides a connection module, which includes: two floating plates formed by a board body of a main circuit board; and at least two connectors respectively fixed to the floating plates. The board body is provided with at least one disconnecting notch, the board body is separated by the disconnecting notch into the two floating plates arranged side by side at an interval and floatable using the disconnecting notch, and the main circuit board is a hard circuit board.

In another aspect, the present invention provides an electronic device, which includes: a housing; a main circuit board fixed to the housing; and at least two connectors respectively fixed to the floating plates. The main circuit board has a board body, the board body is provided with at least one disconnecting notch, the board body is separated by the disconnecting notch into two floating plates arranged side by side at an interval and floatable using the disconnecting notch, and the main circuit board is a hard circuit board. The at least two connectors are pluggable with two counterpart connectors of a pluggable device.

Compared to the related art, the present invention at least achieves the following effects. By using the connection module having a special design, without an additional guide frame, the connectors are able to float in any desired direction and two counterpart connectors are allowed to be precisely plugged at the same time, thereby achieving effects of reducing an overall height and satisfying thinning requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
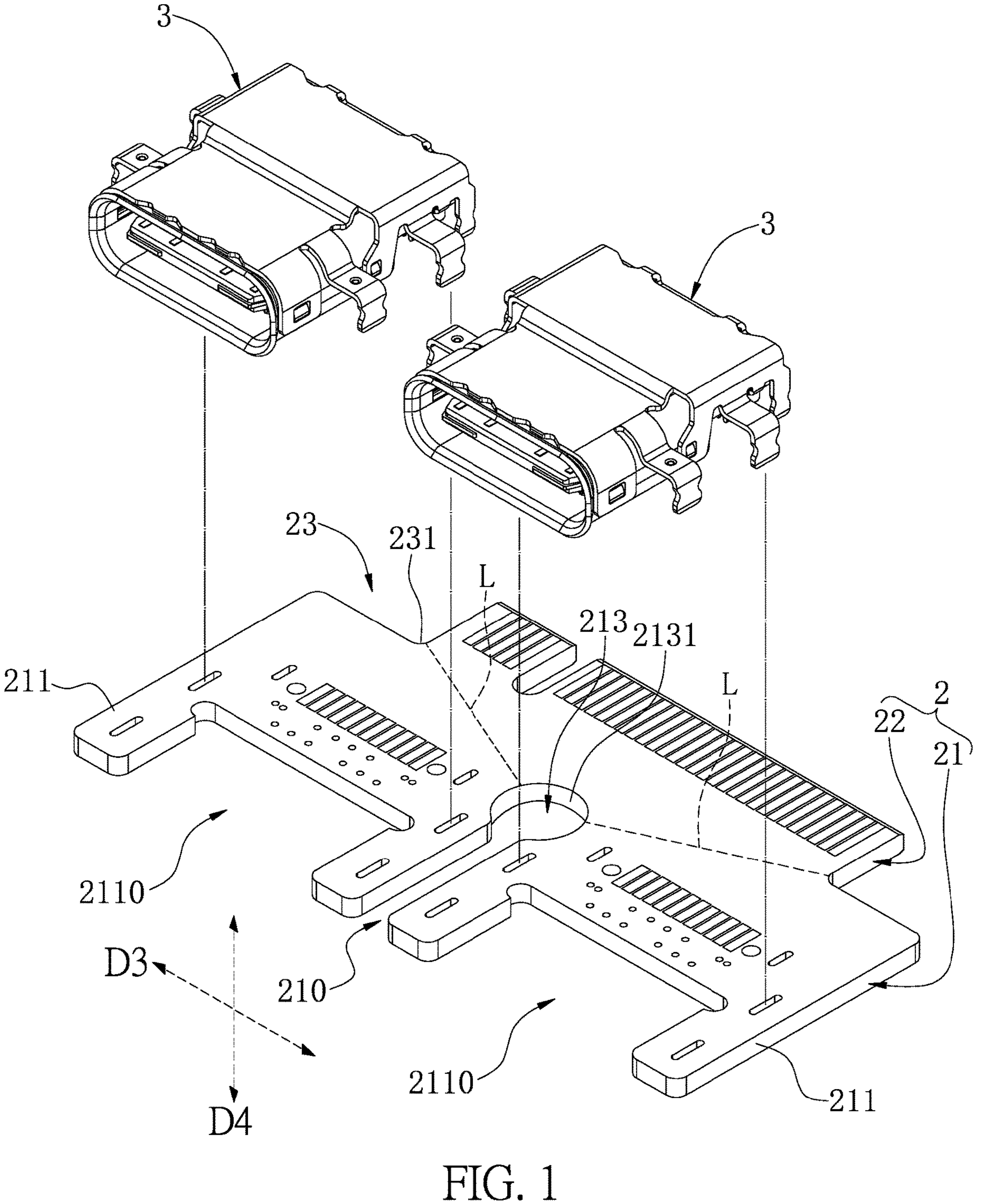
FIG. 1 is a three-dimensional exploded diagram of a hard circuit board and connectors in a connection module of the present invention.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 6:
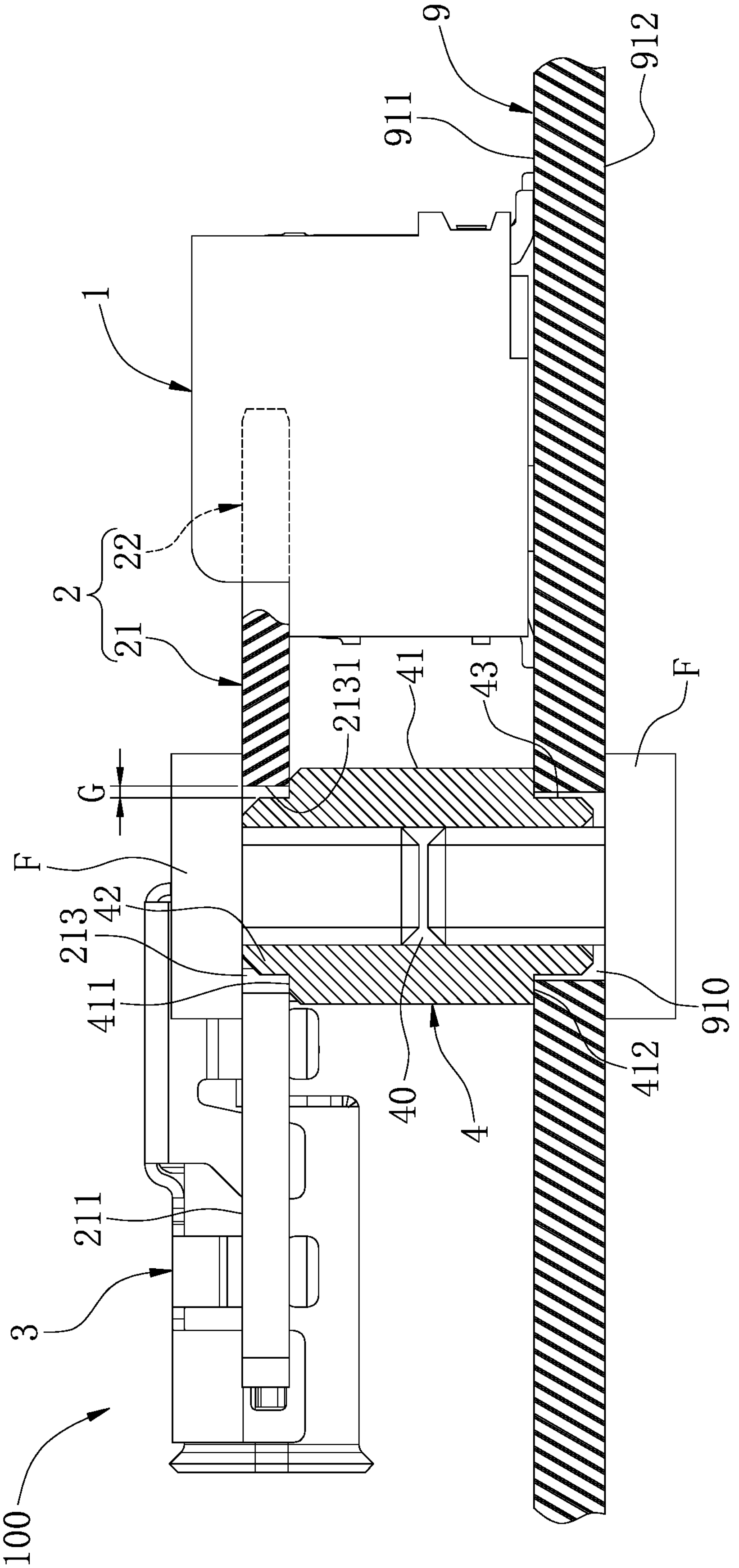
FIG. 6 is a schematic cross-sectional diagram of a connection module of the present invention.
Figure 7:
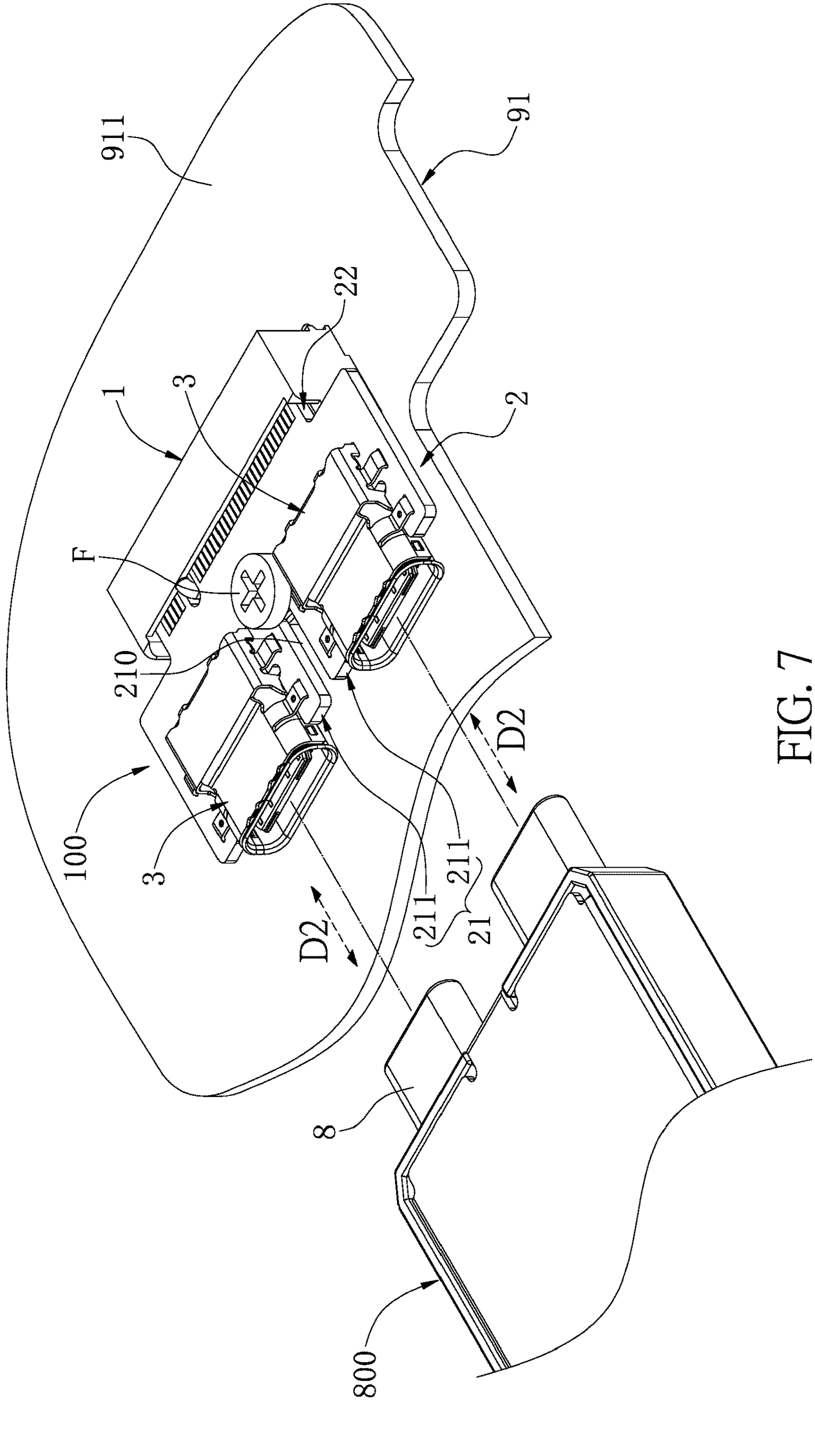
FIG. 7 is a three-dimensional diagram of a connection module of the present invention before plugged to a pluggable device.
Figure 8:
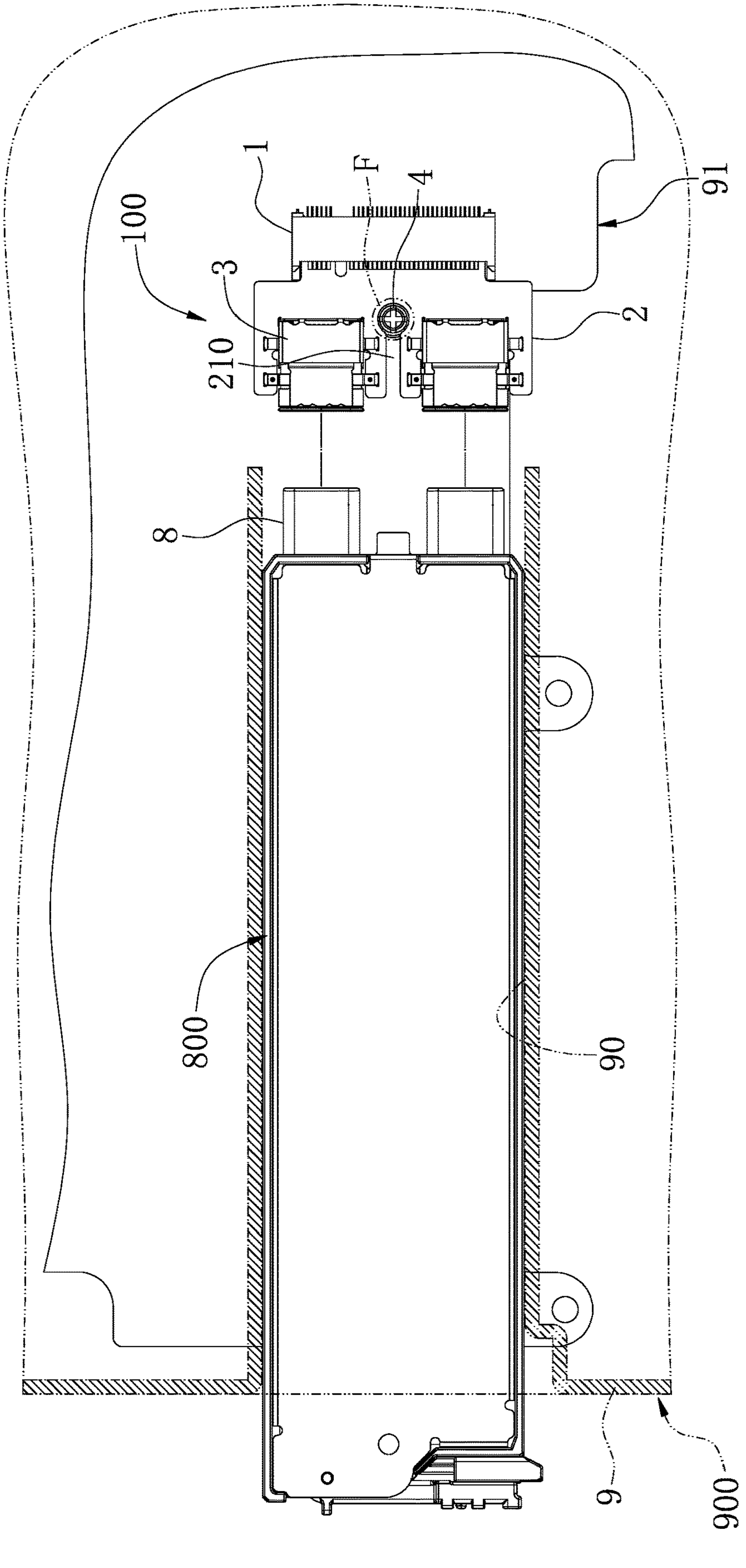
FIG. 8 is a cross-sectional diagram of a connection module of the present invention applied to an electronic product and before plugged to a pluggable device.
Figure 9:
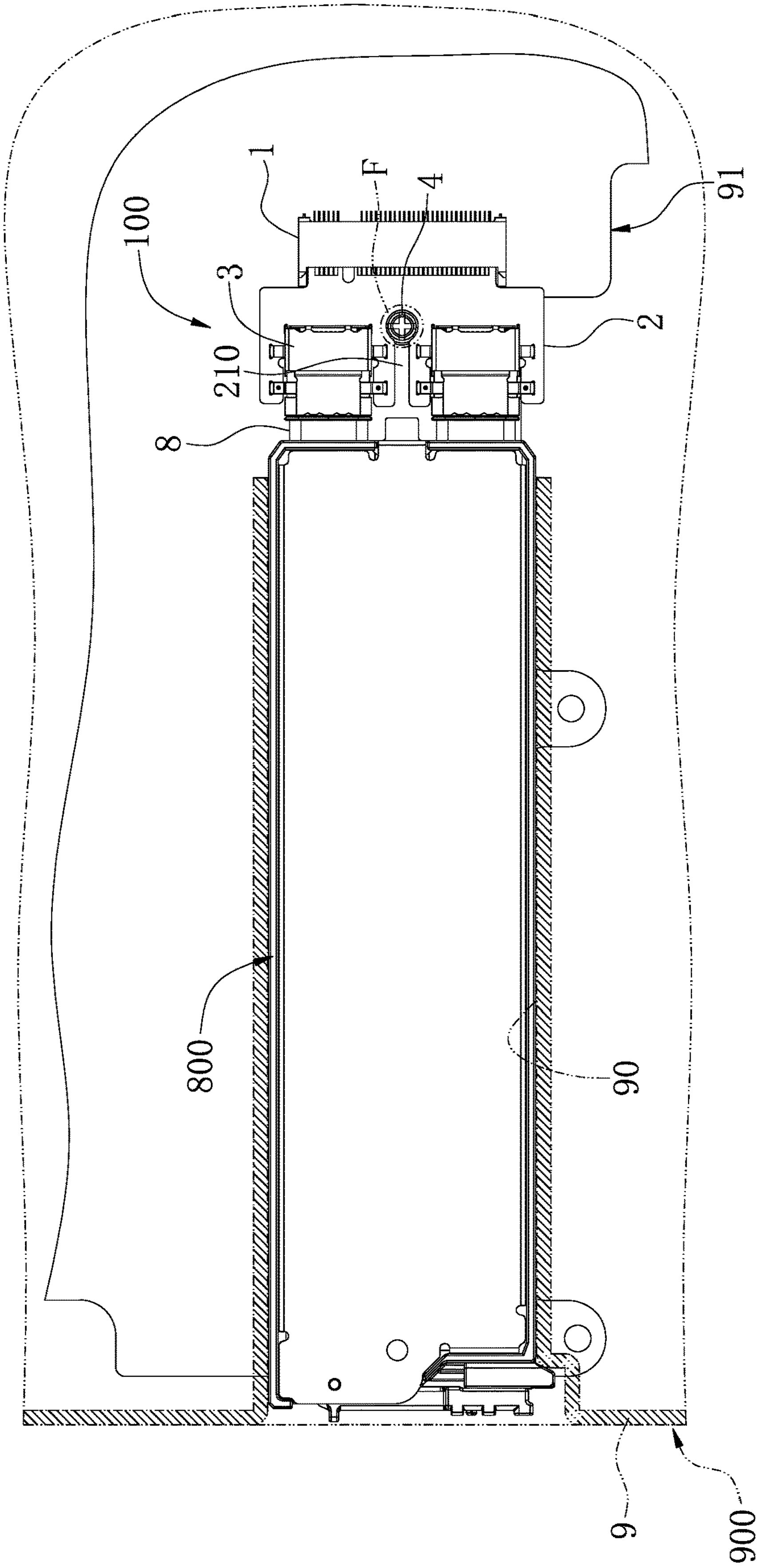
FIG. 9 is a cross-sectional diagram of the connection module in FIG. 8 after plugged to a pluggable device according to the present invention.
Figure 10:
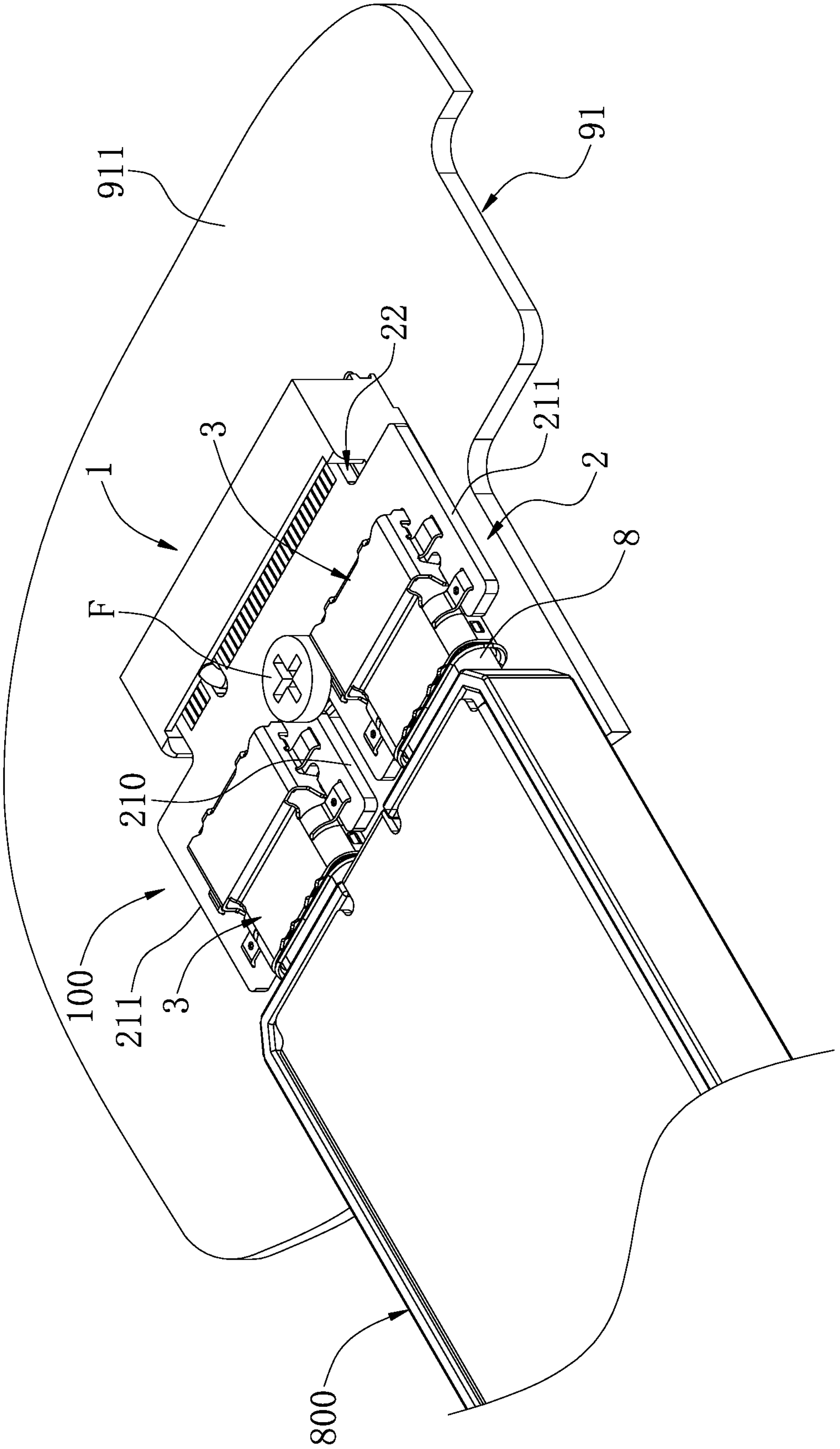
FIG. 10 is a three-dimensional diagram of the connection module in FIG. 7 after plugged to a pluggable device according to the present invention.

The present invention discloses a connection module and a thinning method thereof. As shown in FIG. 7 and FIG. 8, a connection module of the present invention (to be simply referred to as a connection module 100) may be externally connected to outside an electronic product 900 and be used accordingly (not shown), or may be installed inside the electronic product 900 and be used accordingly; the present invention does not impose limitations thereon. The electronic product 900 includes a housing 9, a main circuit board 91 is disposed in the housing 9, and the main circuit board 91 has a first mounting surface 911 and a second mounting surface 912 opposite to each other, as shown in FIG. 6. Moreover, the housing 9 may be further provided with a guide slot 90 corresponding to the connection module 100, so as to guide and plug with a pluggable device 800 using the guide slot 90.

Figure 2:
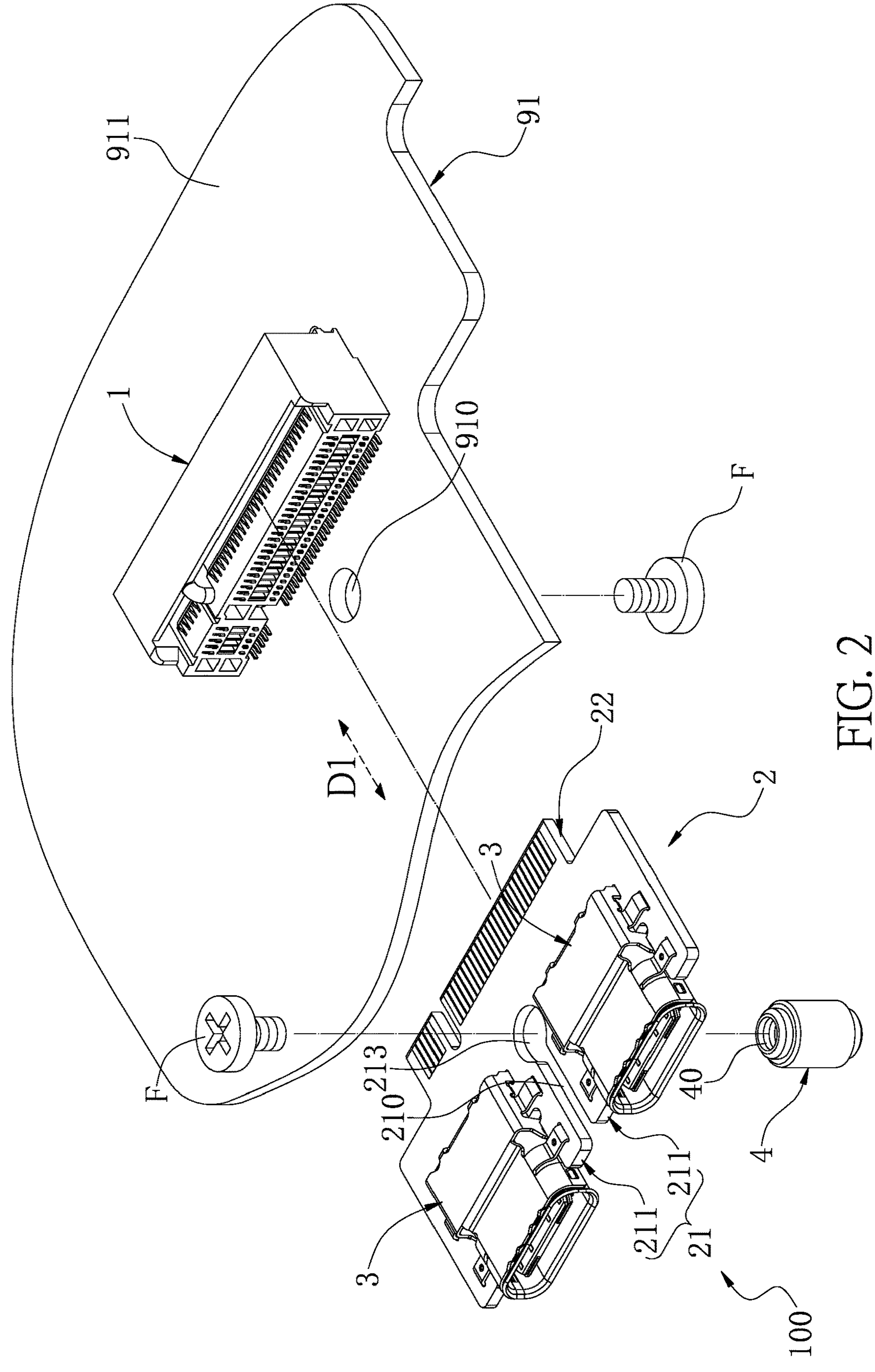
FIG. 2 is a three-dimensional exploded diagram of most of a connection module of the present invention.
Figure 5:
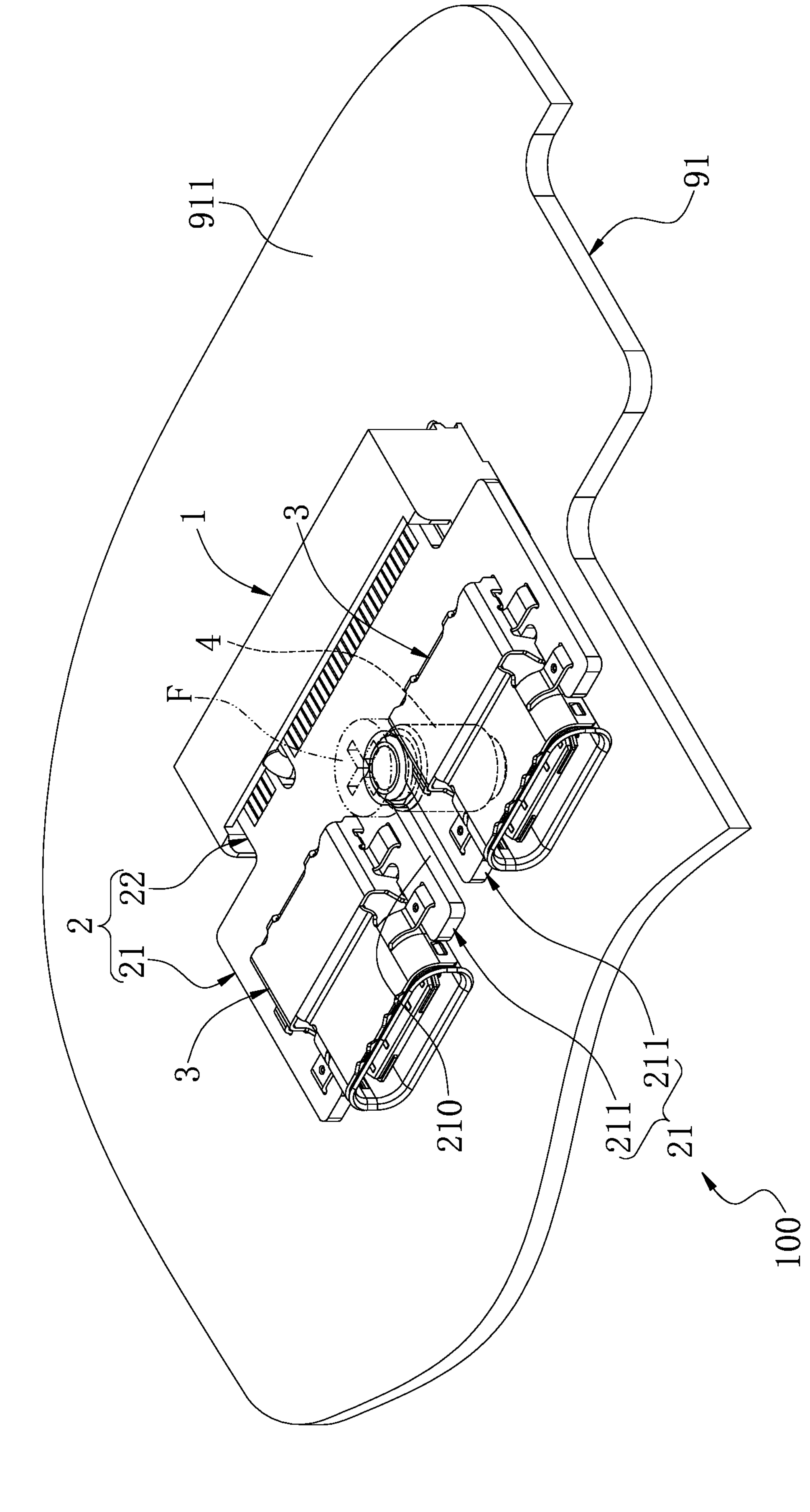
FIG. 5 is a three-dimensional assembly diagram of FIG. 2 according to the present invention.

As shown in FIG. 1, FIG. 2 and FIG. 5, the connection module 100 of the present invention is disposed on the main circuit board 91 and includes a card edge connector 1, a hard circuit board 2 and at least two connectors 3, and preferably includes a fixing column 4.

As shown in FIG. 1, FIG. 2 and FIG. 5, the card edge connector 1 is disposed flat and stationarily on a mounting surface (may be any one of the first and second mounting surfaces 911 and 912 above, and is the first mounting surface 911 in this embodiment) of the main circuit board 91, such that the card edge connector 1 is defined with a first plugging direction D1. The first plugging direction D1 and the first mounting surface 911 of the main circuit board 91 are parallel to each other. The card edge connector 1 is preferably an M.2 connector.

Figure 3:
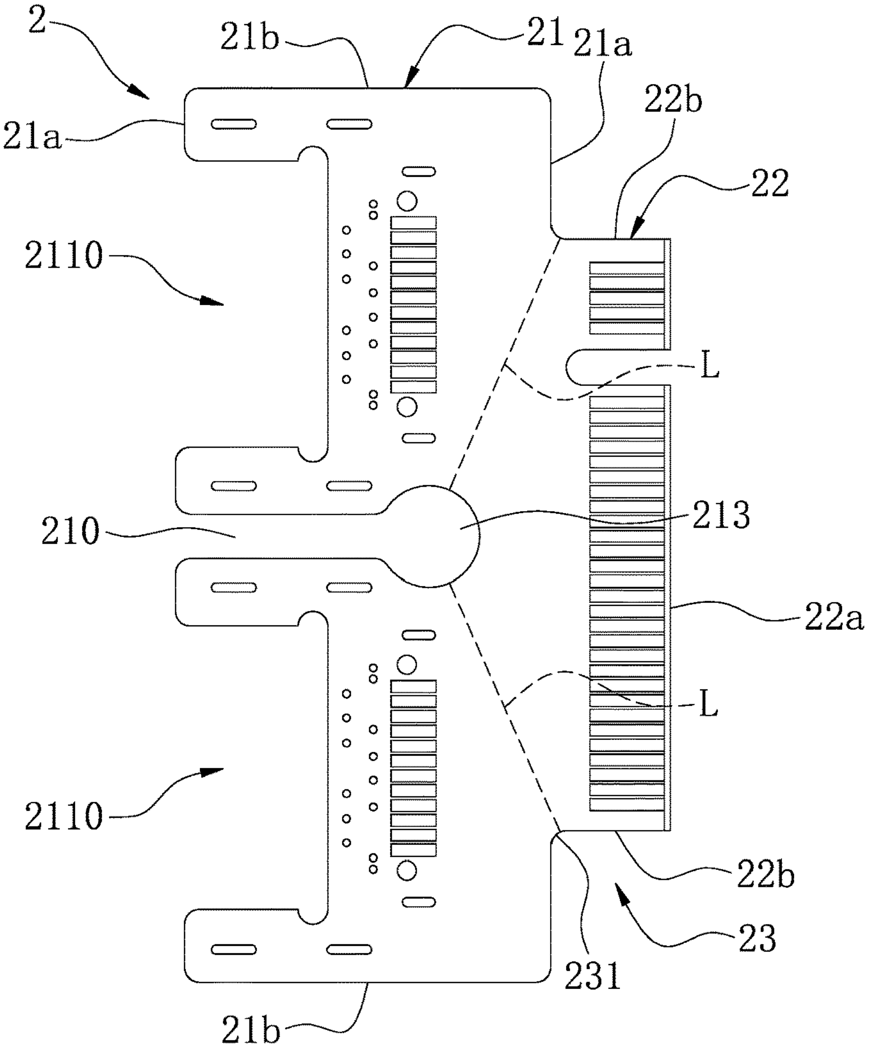
FIG. 3 is a schematic planar diagram of a hard circuit board in FIG. 1 according to the present invention.

As shown in FIG. 1 to FIG. 3, the hard circuit board 2 includes a board body 21 and a connecting tongue 22. The board body 21 has two long sides 21*a* opposite to each other and two short sides 21*b* opposite to each other. The connecting tongue 22 extends integrally from one of the long sides 21*a* of the board body 21 and is for pluggably plugging in the card edge connector 1 in the first plugging direction D1. The hard circuit board 2 is capable of only plugging with the card edge connector 1 by the connecting tongue 22 so as to be fixed with the main circuit board 91, or may be fixed further by other means (to be described in detail later). The connecting tongue 22 similarly has two long sides 22*a* opposite to each other and two short sides 22*b* opposite to each other. One of the long sides 22*a* of the connecting tongue 22 adjoins one of the long sides 21*a* of the board body 21 in a side-by-side manner.

At least one disconnecting notch 210 shaped as a breach is provided on any side of the board body 21, and the number of the disconnecting notch 210 may be one or two or more. In this embodiment, one disconnecting notch 210 provided on the other long side 21*a* of the board body 21 is used as an example for illustration. Thus, the board body 21 is separated by the disconnecting notch 210 into two floating plates 211 arranged side by side at an interval, and the two floating plates 211 are floatable in any desired direction using the disconnecting notch 210. As shown in FIG. 1, the hard circuit board 2 is defined with a side-by-side direction D3 (a direction in which the two floating plates 211 are arranged side by side) and a top-down direction D4. The side-by-side direction D3 and the top-down direction D4 are perpendicular to each other. Each of the floating plates 211 is floatable in any desired direction, that is, floatable in the side-by-side direction D3 and/or the top-down direction D4 (the side-by-side direction D3, the top-down direction D4, or the side-by-side direction D3 and the top-down direction D4).

The number of the connectors 3 is not limited by the present invention, and may be two or three or more; a corresponding number of the connectors 3 is needed according to the number of floating plates 211 of the board body 21. In this embodiment, two connectors 3 are respectively fixed to the two floating plates 211 as an example for illustration.

A structure for fixing the connector 3 to the floating plate 211 may be any fixing structure as desired, and in this embodiment, a sunken plate structure is taken as an example for illustration. That is, each floating plate 211 is provided with a sunken plate opening 2110, so as to embed each connector 3 by a sunken plate means into each sunken plate opening 2110 and fix each connector 3 to each floating plate 211, thereby providing an effect of reducing the overall height. The position for providing each sunken plate opening 2110 may also be on the other long side 21*a* of the board body 21. As shown in FIG. 7, each of the connectors 3 is defined with a second plugging direction D2 for plugging of the pluggable device 800, and the first plugging direction D1 and the second plugging direction D2 are parallel to each other. In other words, both the hard circuit board 2 and the pluggable device 800 are plugged in a direction parallel to the direction of the first mounting surface 911 of the main circuit board 91, but are not plugged in a perpendicular direction, hence also providing an effect of reducing the overall height. The connector 3 is preferably a USB T e-C connector.

Accordingly, as shown in FIG. 5 to FIG. 10, the hard circuit board 2 has two floating plates 211 formed thereon by means of the disconnecting notch 210, and the two connectors 3 are respectively arranged on the two floating plates 211. Thus, when two counterpart connectors 8 of the pluggable device 800 are simultaneously pluggably plugged with the two connectors 3 of the connection module 100 of the present invention in the second plugging direction D2, even if the two connectors 3 and the two counterpart connectors 8 are not precisely aligned, the two counterpart connectors 8 can still be simultaneously and precisely plugged in the two connectors 3 since the two connectors 3 are floatable in any desired direction along with the two floating plates 211. In other words, by using the connection module 100 having a special design of the present invention, without an additional guide frame, the connectors 3 are able to float in any desired direction along with the floating plates 211 and the two counterpart connectors 8 are allowed to be simultaneously and precisely plugged, thereby achieving effects of reducing the overall height and satisfying current thinning requirements. It should be noted that such effects can be achieved in coordination with: 1) embedding the connectors 3 respectively into the sunken plate openings 2110 by a sunken plate means, and 2) using the card edge connector 1 to allow both the hard circuit board 2 and the pluggable device 800 to be plugged in a direction parallel to the first mounting surface 911 of the main circuit board 91.

In addition to fixing the hard circuit board 2 to the main circuit board 91 by plugging in the card edge connector 1, a through hole 213 may be further provided so that the hard circuit board 2 may be fixed to the main circuit board 91 by a fixing element F via the through hole 213. The through hole 213 may be provided at the board body 21 or the connecting tongue 22, and is provided at the board body 21 in this embodiment as an example for illustration. The through hole 213 may be in communication with the disconnecting notch 210 as shown in the drawings, or may not be in communication therewith (not shown). In this embodiment, the through hole 213 is connected to and is in communication with the disconnecting notch 210 as an example for illustration, so as to reduce the distance between the through hole 213 and the disconnecting notch 210 and to minimize the area of the board body 21 (or reduce the area of the hard circuit board 2).

The hard circuit board 2 may be fixed to the main circuit board 91 by the fixing element F via the through hole 213 only. Preferably, the fixing element F is further fixed via the fixing column 4, as shown in FIG. 2 to FIG. 6. The fixing column 4 is erected on the first mounting surface 911 of the main circuit board 91, and has a fixing hole 40, and the fixing element F is secured at the fixing hole 40 via the through hole 213, thereby clamping and securing the hard circuit board 2 between the fixing element F and the fixing column 4.

Figure 4:
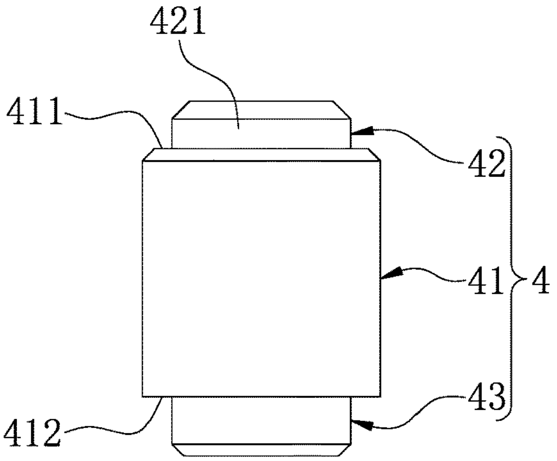
FIG. 4 is a schematic planar diagram of a fixing column in FIG. 2 according to the present invention.

More specifically, as shown in FIG. 4 as well as FIG. 3, FIG. 5 and FIG. 6, the fixing column 4 has a large diameter portion 41 and two small diameter portions 42 and 43 respectively protruding from two ends of the large diameter portion 41. Two flanges 411 and 412 having step difference shapes are formed respectively between the small diameter portions 42 and 43 and the large diameter portion 41, and the main circuit board 91 is provided with a fixing hole 910. The two small diameter portions 42 and 43 are respectively and correspondingly inserted into the through hole 213 and the fixing hole 910. The two fixing elements F respectively pass through the through hole 213 and the fixing hole 910 and are respectively fixed in the fixing holes 40 on the two ends of the fixing column 4, such that the hard circuit board 2 is clamped and secured between the fixing element F and the flange 411 of the fixing column 4. That is, the fixing column 4 is configured to support the hard circuit board 2 by the flange 411. Furthermore, the main circuit board 91 is clamped and secured between the flange 412 of the fixing column 4 and the fixing element F, so as to enable the fixing column 4 to be supported on the first mounting surface 911 of the main circuit board 91 by the flange 412.

Referring to FIG. 6 as well as FIG. 4 and FIG. 5, the through hole 213 of the hard circuit board 2 has an inner periphery 2131, the small diameter portion 42 of the fixing column 4 has an outer periphery 421, and the inner periphery 2131 and the outer periphery 421 are spaced apart by a gap G formed in between (referring to FIG. 6). Thus, each of the floating plates 211 is floatable in any desired direction via the disconnecting notch 210 and the gap G, and in particular, each of the floating plates 211 is floatable in the side-by-side direction D3.

The through hole 213 above may be in communication with any portion of the disconnecting notch 210, and is in communication with an inner end of the disconnecting notch 210 in this embodiment as an example for illustration, such that the through hole 213 becomes a notch bottom of the disconnecting notch 210. In other embodiments not shown in the drawings, if the through hole 213 is not in communication with the disconnecting notch 210, the inner end of the disconnecting notch 210 is the notch bottom.

To enhance the floating ability of each of the floating plates 211 in the top-down direction D4, as shown in FIG. 1 and FIG. 3, the length of the connecting tongue 22 is designed to be less than the length of the board body 21, so that two concave portions 23 of the hard circuit board 2 are respectively formed between one long side 21*a* of the board body 21 and two short sides 22*b* of the connecting tongue 22. By using the concave portions 23, a distance L between the notch bottom of the disconnecting notch 210 and a concave portion inner corner 231 of each of the concave portions 23 is reduced for the floating plates 211, so as to allow the floating plates 211 to float in the top-down direction D4 more easily.

Moreover, as described above, in other embodiments not shown in the drawings, the hard circuit board 2 may be provided with two or more disconnecting notches 210, and each of the through hole 213 and the fixing column 4 is provided in singular form, for the reason that only one additional second fixing portion is needed in addition to fixing the hard circuit board 2 to the card edge connector 1 (a first fixing portion). The second fixing portion may be fixed by the fixing element F only, or the fixing element F may be fixed to the fixing column 4.

Figure 11:
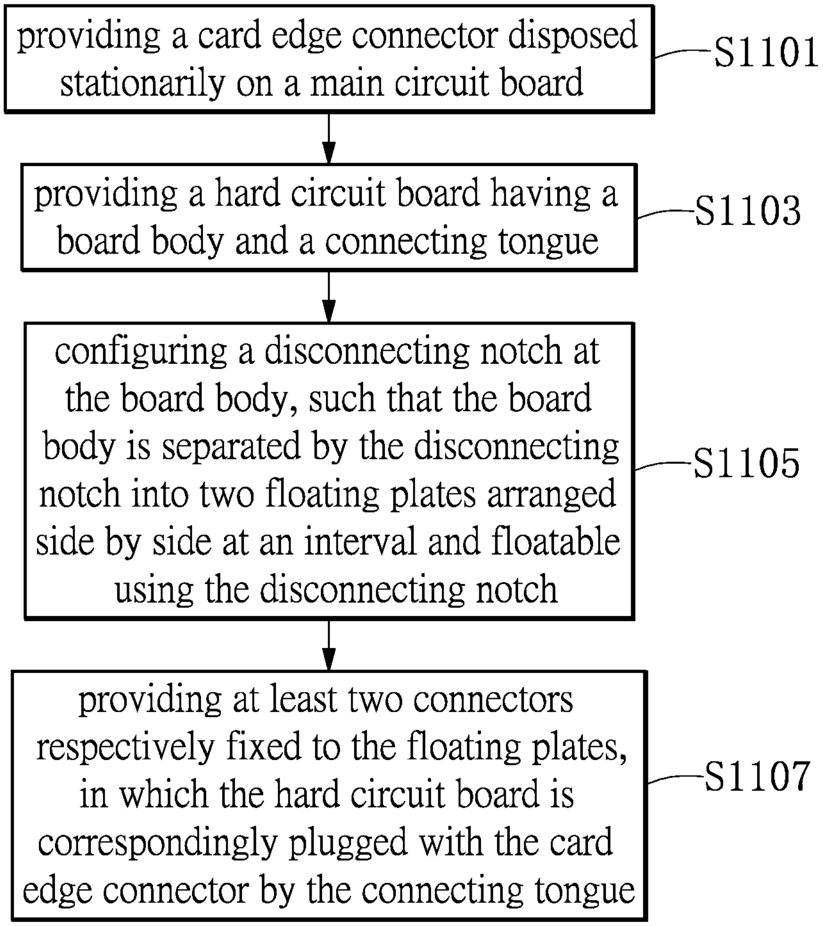
FIG. 11 is a flowchart of a thinning method disclosed in the present invention.

As shown in FIG. 11, a thinning method of a connection module disclosed in the present invention is applied to disposing the main circuit board 91, and includes: step S1101 of providing a card edge connector 1; step S1103 of providing a hard circuit board 2; step S1105 of configuring a disconnecting notch 210; and step S1107 of providing at least two connectors 3.

In step S1101 of providing a card edge connector 1, the card edge connector 1 is disposed stationarily on the first mounting surface 911 of the main circuit board 91. In step S1103 of providing a hard circuit board 2, the hard circuit board 2 has a board body 21 and a connecting tongue 22 protruding integrally from one of the long sides 21*a* of the board body 21. In step S1105 of configuring a disconnecting notch 210, the disconnecting notch 210 is configured at the board body 21, so that the board body 21 is separated by the disconnecting notch 210 into two floating plates 211 arranged side by side at an interval and the two floating plates 211 are floatable in any desired direction using the disconnecting notch 210. In step S1107 of providing two connectors 3, the connectors 3 are respectively fixed to the floating plates 211, such that the connectors 3 are floatable in any desired direction along with the floating plates 211. The hard circuit board 2 is correspondingly plugged with the card edge connector 1 by the connecting tongue 22 thereof.

Thus, by using the connection module 100 having a special design of the present invention, without an additional guide frame, the connectors 3 are able to float in any desired direction along with the floating plates 211 and the two counterpart connectors 8 are allowed to be simultaneously and precisely plugged, thereby achieving effects of reducing the overall height and satisfying current thinning requirements.

Figure 12:
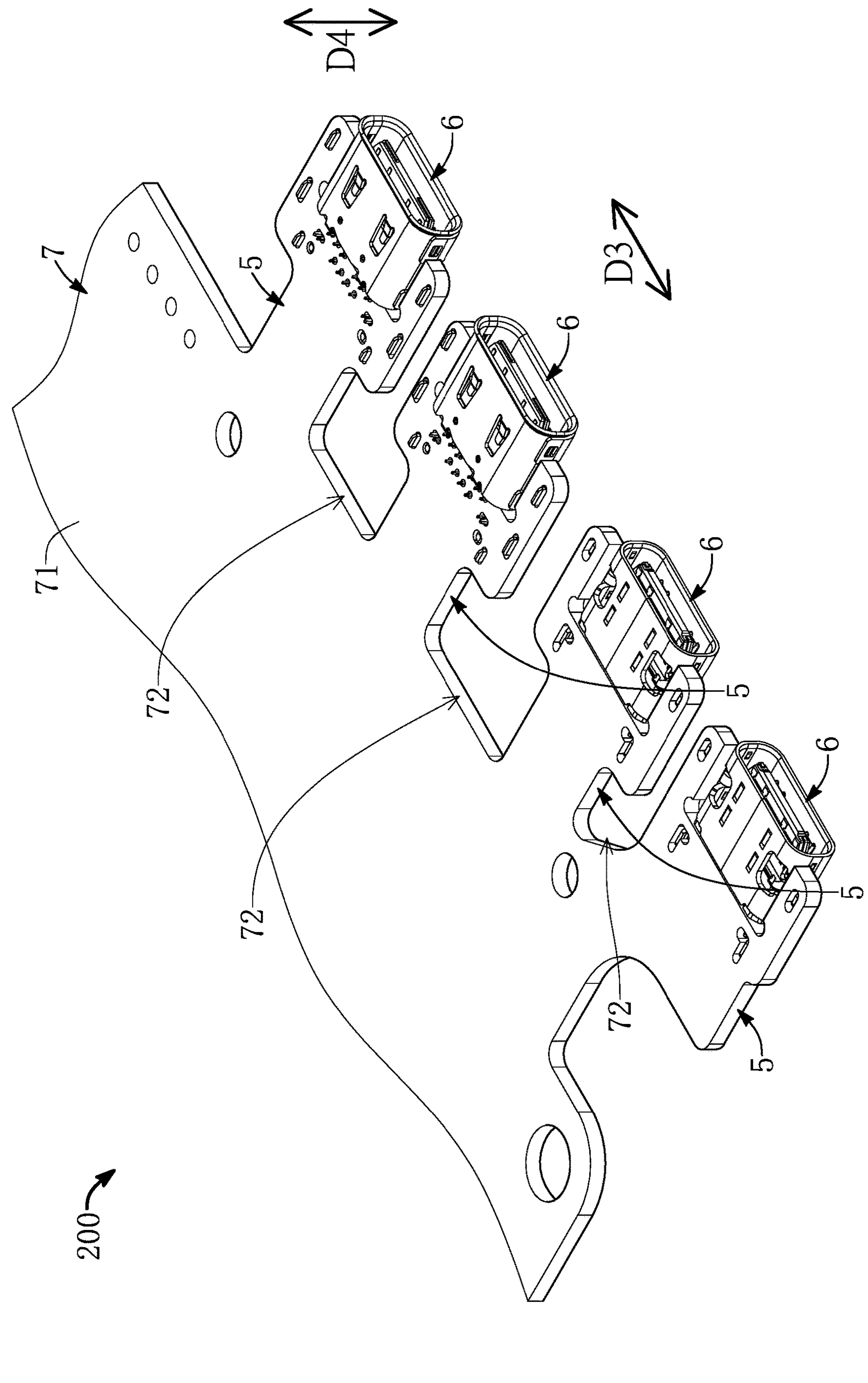
FIG. 12 is a schematic diagram of a connection module according to another embodiment of the present invention.

Reference is made to FIG. 12, which is a schematic diagram of a connection module according to another embodiment of the present invention. The main difference between the present embodiment and the previous embodiment is that a connection module 200 includes four floating plates 5 and four connectors 6. Each floating plate 5 is formed by extending from a board body 71 of a main circuit board 7. The board body 71 is configured to have three disconnecting notches 72, and the board body 71 is separated by the three disconnecting notches 72 into the four floating plates 5 arranged side by side at an interval and floatable using the disconnecting notches 72. That is, each floating plate 5 is movable along the top-down direction D4 and the side-by-side direction D3. The quantity of each of the floating plates 5, the connectors 6, and the disconnecting notches 72 can be changed according to practical requirements. Essentially, one of the disconnecting notches 72 is correspondingly formed between two of the floating plates 5. In practice, the main circuit board 7 is a hard circuit board, and is a motherboard of an electronic device (e.g., a notebook computer). The connectors 6 are respectively fixed to the floating plates 5. In other words, in the present embodiment, the four floating plates 5 of the connection module 200 are integrally formed with the main circuit board 7. Through such a configuration, manufacturing costs can be significantly reduced, and a manufacturing process can be effectively simplified.

In a practical application, the connector 6 fixed to the floating plate 5 is able to move within a first predetermined range (e.g., from 0 mm to 0.3 mm) along the top-down direction D4, and is able to move within a second predetermined range (e.g., from 0 mm to 0.3 mm) along the side-by-side direction D3. In this way, when a user operates the pluggable device 800 (as shown in FIG. 7), even if the two counterpart connectors 8 of the pluggable device 800 and the two connectors 6 are not precisely aligned with each other during a mating process, the two counterpart connectors 8 can still be simultaneously and precisely mated with the two connectors 6 since the two connectors 6 are floatable with the two floating plates 5 along the top-down direction D4 and the side-by-side direction D3. Numerical values of the first predetermined range and the second predetermined range are not limited by the examples mentioned above (which may vary according to practical requirements). In practice, the first predetermined range and the second predetermined range can be modified by, for example, changing the size or the material of each floating plate 5.

Figure 13:
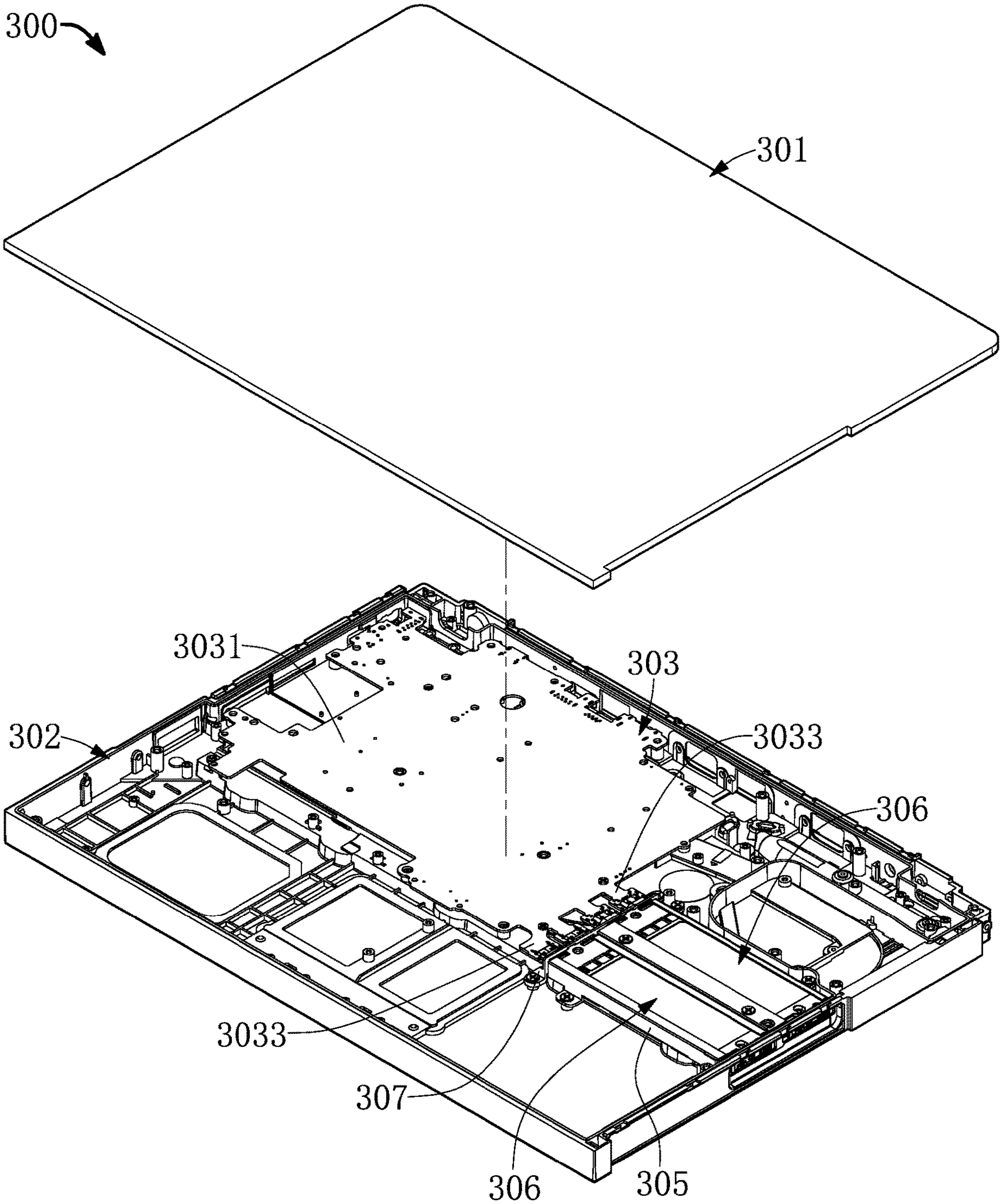
FIG. 13 is a partial exploded diagram of an electronic device according to the present invention.
Figure 14:
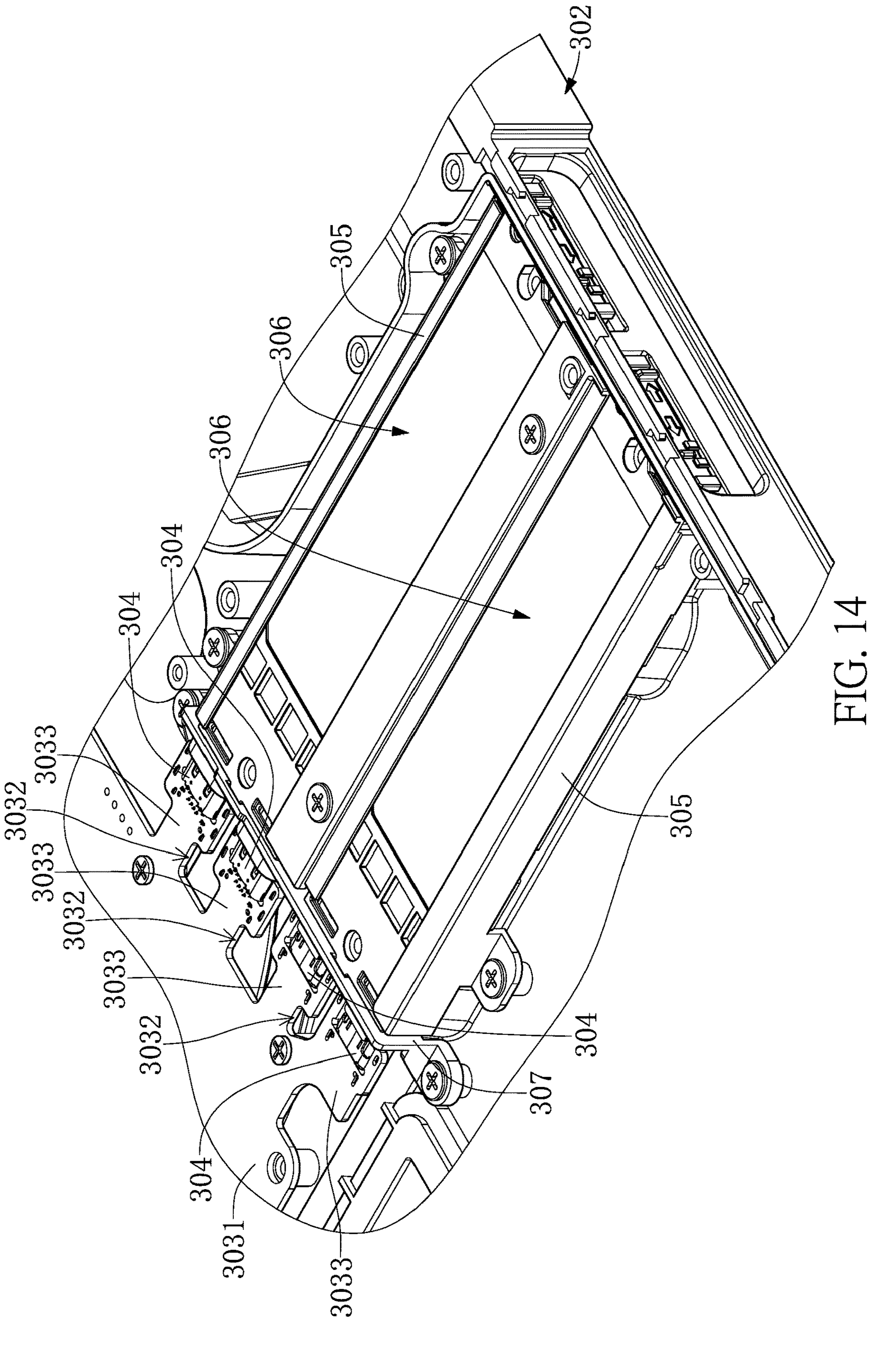
FIG. 14 is a partial enlarged diagram of FIG. 13.
Figure 15:
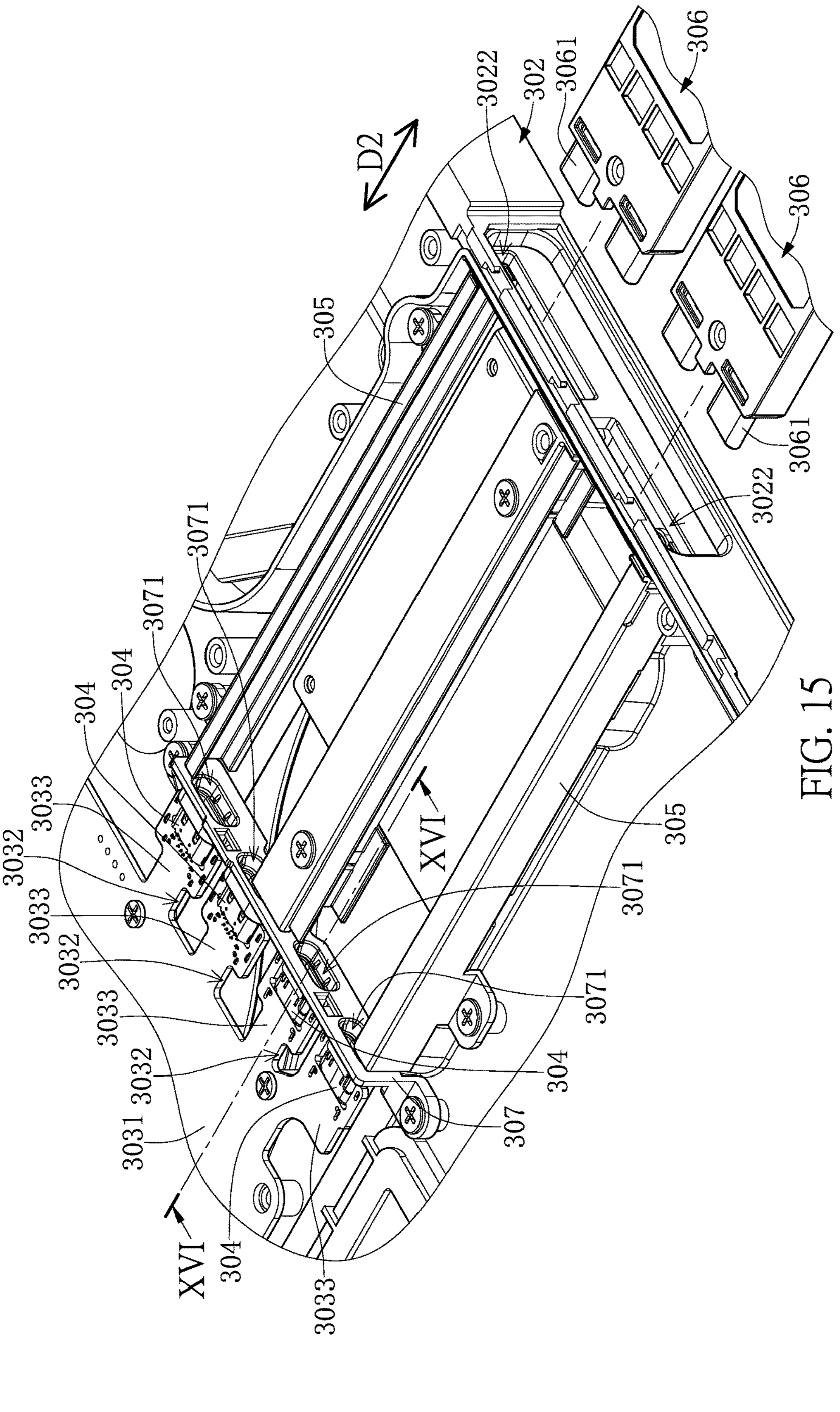
FIG. 15 is a schematic exploded diagram of partial components of the electronic device according to the present invention.
Figure 16:
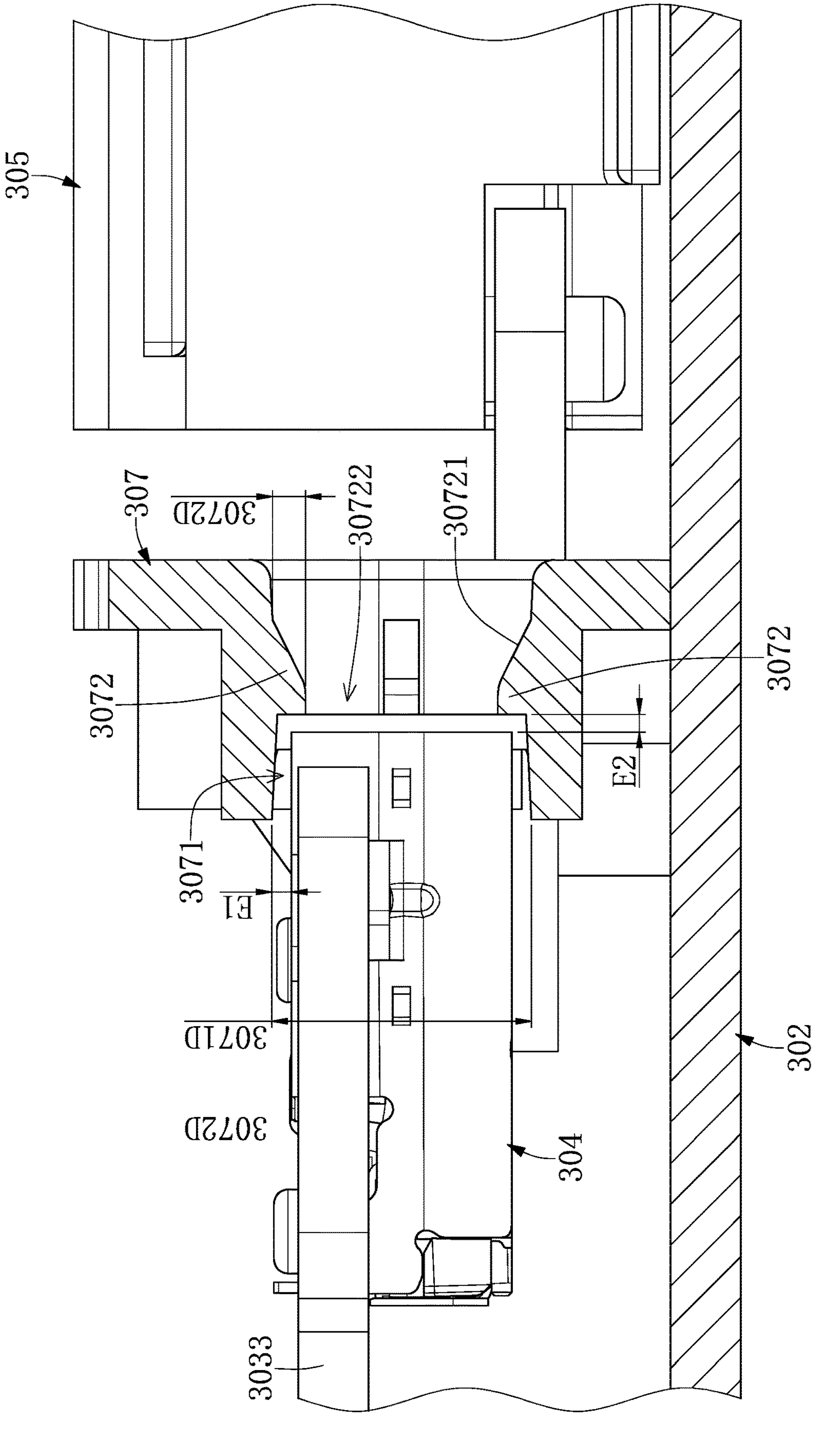
FIG. 16 is a schematic diagram showing the electronic device that is not installed with a pluggable device and a partial cross-section of an alignment component according to the present invention.
Figure 17:
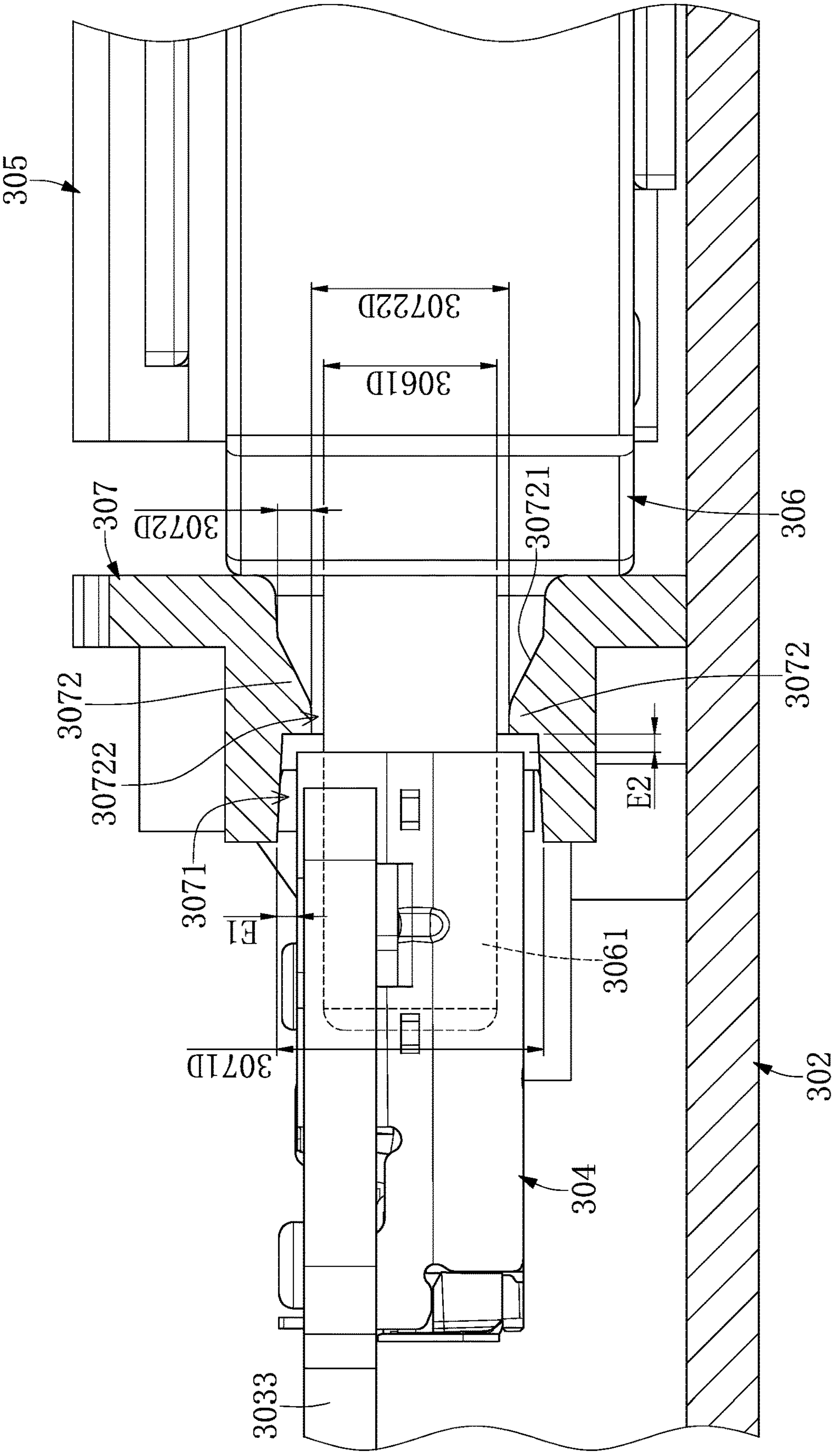
FIG. 17 is a schematic diagram showing the electronic device that is installed with the pluggable device and the partial cross-section of the alignment component according to the present invention.

Reference is made to FIG. 13 to FIG. 17. FIG. 13 is a partial exploded diagram of an electronic device according to the present invention. FIG. 14 is a partial enlarged diagram of FIG. 13. FIG. 15 is a schematic exploded diagram of partial components of the electronic device according to the present invention. FIG. 16 is a schematic diagram showing the electronic device that is not installed with a pluggable device and a partial cross-section of an alignment component according to the present invention. FIG. 17 is a schematic diagram showing the electronic device that is installed with the pluggable device and the partial cross-section of the alignment component according to the present invention.

An electronic device 300 includes a bottom cover 301, a housing 302, a main circuit board 303, four connectors 304, two device guide components 305, two pluggable devices 306, and an alignment component 307. In other embodiments of the present invention, the electronic device 300 can be without the pluggable device 306. The electronic device 300 can be, for example, a notebook computer or a tablet computer. The main circuit board 303 is fixedly disposed on the housing 302. The bottom cover 301 is detachably fixed to one side of the housing 302. The main circuit board 303 is fixed to the housing 302, and has a board body 3031, three disconnecting notches 3032, and four floating plates 3033. The four connectors 304 are fixed to the four floating plates 3033. The main circuit board 303, the board body 3031, the disconnecting notch 3032, the floating plate 3033, and the connector 304 of the present embodiment are the same as the main circuit board 7, the board body 71, the disconnecting notch 72, the floating plate 5, and the connector 6 of the previous embodiment, and will not be reiterated herein. The main circuit board 303 is a hard circuit board. In one embodiment where the electronic device 300 is a notebook computer or a tablet computer, the main circuit board 303 is the motherboard. Each connector 304 is pluggable with each counterpart connector 3061 of the pluggable device 306. The pluggable device 306 can be, for example, a solid-state drive (SSD).

An accommodating space 3021 is provided within the housing 302. The accommodating space 3021 is used to accommodate the main circuit board 303 and other electronic components (e.g., a hard drive and a battery) included in the electronic device 300. Another side of the housing 302 further has two operation openings 3022, and each of the operation openings 3022 penetrates through the housing 302. The two device guide components 305 and the alignment component 307 are fixed to the housing 302 (e.g., by screws), and the two device guide components 305 and the alignment component 307 are located in the accommodating space 3021.

The pluggable device 306 is able to enter the accommodating space 3021 through the operation opening 3022, and the two device guide components 305 are capable of guiding the pluggable devices 306 within the accommodating space 3021. In this way, the two counterpart connectors 3061 of the pluggable device 306 can be plugged with the two connectors 304 through two alignment holes 3071 of the alignment component 307. The quantities of the operation openings 3022 and the pluggable devices 306 are not limited to being two, and can be increased or decreased according to practical requirements. More specifically, the device guide component 305 can be, for example, a structure similar to a slide groove. After the pluggable device 306 enters the accommodating space 3021 through the operation opening 3022, the pluggable device 306 can move along the second plugging direction D2 by being guided and limited by the device guide component 305.

The alignment component 307 has four alignment holes 3071, and each of the alignment holes 3071 penetrate through the alignment component 307. A portion of the connector 304 is correspondingly located in one of the alignment holes 3071, and a distance E1 between the connector 304 and an inner side wall forming the alignment hole 3071 is at least greater than a predetermined distance range. In a practical application, the predetermined distance range can be from 0 mm to 0.5 mm, but is not limited thereto. Through the above-mentioned configuration, even factoring in manufacturing or assembly tolerances during manufacturing or assembly of the connector 304, the alignment component 307 or the alignment hole 3071, it is still possible for a portion of the connector 304 to be disposed in the alignment hole 3071.

Preferably, an inner diameter 3071D of the alignment hole 3071 gradually decreases from one end adjacent to the connector 304 toward another end distant from the connector 304, and a difference between a minimum inner diameter of the alignment hole 3071 and an outer diameter of the connector 304 is within a predetermined difference range. In a practical application, the predetermined difference range can be, for example, from 0 mm to 0.5 mm, but is not limited thereto. In other words, one side of the alignment hole 3071 facing the connector 304 substantially has a structure having a shape similar to that of a bell mouth. Through the above-mentioned configuration, when a portion of the connector 304 is to be disposed in the alignment hole 3071, corresponding positions of the connector 304 and the alignment hole 3071 can be effectively calibrated, thereby allowing the connector 304 to be more easily assembled to the alignment hole 3071 at a correct position.

In one exemplary embodiment, the alignment component 307 includes a plurality of guide structures 3072 in each of the alignment holes 3071, and the guide structures 3072 are configured to surround the alignment hole 3071. The guide structure 3072 has a thickness that gradually decreases from one end adjacent to the connector 304 toward another end distant from the connector 304, and a guide slope 30721 is disposed at another end of the guide structure 3072 distant from the connector 304. The counterpart connector 3061 of the pluggable device 306 is pluggable with a corresponding one of the connectors 304 through being guided by the guide slope 30721. For the alignment component 307, the quantity of the guide structures 3072 in each of the alignment holes 3071 can be, such as but not limited to, six, and can be changed according to practical requirements. Through the configuration of the guide structures 3072 and the guide slope 30721, the counterpart connector 3061 of the pluggable device 306 can be guided to a correct position by the guide slope 30721 during a process of entering the alignment hole 3071, so as to be plugged with the connector 304 in an improved manner.

Based on the above, after the pluggable device 306 enters the accommodating space 3021 through the operation opening 3022, the pluggable device 306 will be guided by the device guide component 305 and move along the second plugging direction D2. When the counterpart connector 3061 of the pluggable device 306 enters the alignment hole 3071 of the alignment component 307, the counterpart connector 3061 will be guided by the guide structures 3072 to a correct position. Finally, the counterpart connector 3061 will be plugged with the connector 304 located in the alignment hole 3071. That is to say, through the configuration and cooperation of the device guide component 305, the alignment component 3071, and the guide structures 3072, the counterpart connector 3061 of the pluggable device 306 can be accurately connected to the connector 304.

A gap is provided between the connector 304 and the inner side wall forming the alignment hole 3071. In addition, the connector 304 is disposed on the floating plate 3033, and the floating plate 3033 is moveable within a certain range along a top-down direction and a side-by-side direction. Therefore, even if there are some deviations in position when the counterpart connector 3061 enters the alignment hole 3071, the connector 304 is still able to be smoothly plugged with the counterpart connector 3061.

A distance E2 between one end of the connector 304 adjacent to the alignment component 307 and an adjacent one of the guide structures 3072 is within the predetermined distance range, and the outer diameter of the connector 304 is greater than an inner diameter of an insertion opening 30722 jointly formed by the guide structures 3072. For example, the distance E2 between one end of the connector 304 adjacent to the alignment component 307 and an adjacent one of the guide structures 3072 can be between 0 mm and 0.2 mm Through the above-mentioned configuration, a portion of the connector 304 can still be disposed in the alignment hole 3071 when the connector 304 has a manufacturing tolerance, the alignment component 307 has a manufacturing tolerance, the connector 304 has an assembly tolerance, or the alignment component 307 has an assembly tolerance.

In practice, the inner diameter of the insertion opening 30722 is greater than an outer diameter of the counterpart connector 3061, and a difference E3 between the inner diameter of the insertion opening 30722 and the outer diameter of the counterpart connector 3061 is within the predetermined distance range. For example, the difference E3 between the inner diameter of the insertion opening 30722 and the outer diameter of the counterpart connector 3061 can be between 0 mm and 0.3 mm Through this configuration, when the counterpart connector 3061 has a manufacturing tolerance, the guide structure 3072 has a manufacturing tolerance, or the alignment component 307 has an assembly tolerance, the counterpart connector 3061 can still smoothly pass through the insertion opening 30722 and be plugged with the connector 304.

In conclusion, the connection module and the electronic device provided by the present invention are capable of achieving expected utilization objects and resolving drawbacks of the related art, and thus the present invention completely meets the requirements of a patent application. Therefore, a patent application is filed accordingly, and granting the application with patent rights is respectfully requested to ensure rights of the Inventor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A connection module, comprising:
two floating plates formed by a board body of a hard circuit board of a main circuit board, wherein:
the board body defines an uppermost surface and a bottommost surface of the hard circuit board,
the board body is provided with at least one disconnecting notch, and
the board body is separated by the at least one disconnecting notch into the two floating plates arranged side by side at an interval and floatable using the at least one disconnecting notch
at least two connectors respectively fixed to the two floating plates.

2. The connection module according to claim 1, wherein each of the at least two connectors fixed to the two floating plates is able to move within a first predetermined range along a top-down direction, and is able to move within a second predetermined range along a side-by-side direction.

3. The connection module according to claim 1, wherein the hard circuit board comprises a connecting tongue protruding from a surface of the board body opposite the two floating plates.

4. The connection module according to claim 3, wherein the connecting tongue is integrally connected with the board body.

5. The connection module according to claim 3, wherein the connecting tongue protrudes from a surface of the board body perpendicular to the uppermost surface of the hard circuit board.

6. The connection module according to claim 3, wherein an uppermost surface of the connecting tongue is co-planar with an uppermost surface of the board body and a lowermost surface of the connecting tongue is co-planar with a lowermost surface of the board body.

7. An electronic device, comprising:
a housing;
a main circuit board fixed to the housing, wherein:
the main circuit board has a hard circuit board having board body,
the board body defines an uppermost and a bottommost surface of the hard circuit board,
the board body is provided with at least one disconnecting notch, and
the board body is separated by the at least one disconnecting notch into two floating plates arranged side by side at an interval and floatable using the at least one disconnecting notch;
and
at least two connectors respectively fixed to the two floating plates, wherein the at least two connectors are pluggable with two counterpart connectors of a pluggable device.

8. The electronic device according to claim 7, further comprising one or multiple ones of the pluggable device and at least two device guide components, wherein:
an accommodating space is provided within the housing,
the housing has an operation opening,
the pluggable device is able to enter the accommodating space through the operation opening, and
the at least two device guide components are capable of guiding the pluggable device within the accommodating space, such that the two counterpart connectors of the pluggable device are plugged with the at least two connectors.

9. The electronic device according to claim 8, further comprising an alignment component, wherein:
the alignment component is fixed to the housing,
the alignment component has at least two alignment holes,
portions of the at least two connectors are located in the at least two alignment holes, and
a distance between a corresponding one of the at least two connectors and an inner side wall forming a corresponding one of the at least two alignment holes is at least greater than a predetermined distance range.

10. The electronic device according to claim 9, wherein;
an inner diameter of the corresponding one of the at least two alignment holes gradually decreases from one end adjacent to the corresponding one of the at least two connectors toward another end distant from the corresponding one of the at least two connectors, and
a difference between a minimum inner diameter of the corresponding one of the at least two alignment holes and an outer diameter of the corresponding one of the at least two connectors is within a predetermined difference range.

11. The electronic device according to claim 9, wherein:
the alignment component comprises a plurality of guide structures in each of the at least two alignment holes,
the plurality of guide structures are configured to surround the corresponding one of the at least two alignment holes,
each of the plurality of guide structures has a thickness that gradually decreases from one end adjacent to the corresponding one of the at least two connectors toward another end distant from the corresponding one of the at least two connectors,
a guide slope is disposed at the another end of a corresponding one of the plurality of guide structures distant from the corresponding one of the at least two connectors, and
the two counterpart connectors of the pluggable device are pluggable with the corresponding one of the at least two connectors through being guided by the guide slope.

12. The electronic device according to claim 11, wherein:
a distance between one end of the corresponding one of the at least two connectors adjacent to the alignment component and an adjacent one of the plurality of guide structures is within the predetermined distance range, and
an outer diameter of the corresponding one of the at least two connectors is greater than an inner diameter of an insertion opening jointly formed by the plurality of guide structures.

13. The electronic device according to claim 12, wherein:
the inner diameter of the insertion opening is greater than an outer diameter of a corresponding one of the two counterpart connectors, and
a difference between the inner diameter of the insertion opening and the outer diameter of the corresponding one of the two counterpart connectors is within the predetermined distance range.

14. The electronic device according to claim 7, wherein: the at least two connectors respectively fixed to the two floating plates is able to move within a first predetermined range along a top-down direction, and is able to move within a second predetermined range along a side-by-side direction.

15. The electronic device according to claim 7, wherein the hard circuit board comprises a connecting tongue protruding from a surface of the board body opposite the two floating plates.

16. An electronic device, comprising:

a housing;

a main circuit board fixed to the housing, wherein:

the main circuit board has a board body, the board body is provided with at least one disconnecting notch, the board body is separated by the at least one disconnecting notch into two floating plates arranged side by side at an interval and floatable using the at least one disconnecting notch, and the main circuit board is a hard circuit board;

at least two connectors respectively fixed to the two floating plates, wherein the at least two connectors are pluggable with two counterpart connectors of a pluggable device;

at least two device guide components, wherein:

an accommodating space is provided within the housing, the housing has an operation opening, the pluggable device is able to enter the accommodating space through the operation opening, and the at least two device guide components are capable of guiding the pluggable device within the accommodating space, such that the two counterpart connectors of the pluggable device are plugged with the at least two connectors; and an alignment component, wherein:

the alignment component is fixed to the housing, the alignment component has at least two alignment holes, portions of the at least two connectors are located in the at least two alignment holes, and a distance between a corresponding one of the at least two connectors and an inner side wall forming a corresponding one of the at least two alignment holes is at least greater than a predetermined distance range.

17. The electronic device according to claim 16, wherein:

an inner diameter of the corresponding one of the at least two alignment holes gradually decreases from one end adjacent to the corresponding one of the at least two connectors toward another end distant from the corresponding one of the at least two connectors, and a difference between a minimum inner diameter of the corresponding one of the at least two alignment holes and an outer diameter of the corresponding one of the at least two connectors is within a predetermined difference range.

18. The electronic device according to claim 16, wherein:

the alignment component comprises a plurality of guide structures in each of the at least two alignment holes, the plurality of guide structures are configured to surround the corresponding one of the at least two alignment holes, each of the plurality of guide structures has a thickness that gradually decreases from one end adjacent to the corresponding one of the at least two connectors toward another end distant from the corresponding one of the at least two connectors, a guide slope is disposed at the another end of a corresponding one of the plurality of guide structures distant from the corresponding one of the at least two connectors, and the two counterpart connectors of the pluggable device are pluggable with the corresponding one of the at least two connectors through being guided by the guide slope.

19. The electronic device according to claim 18, wherein:

a distance between one end of the corresponding one of the at least two connectors adjacent to the alignment component and an adjacent one of the plurality of guide structures is within the predetermined distance range, and an outer diameter of the corresponding one of the at least two connectors is greater than an inner diameter of an insertion opening jointly formed by the plurality of guide structures.

20. The electronic device according to claim 19, wherein:

the inner diameter of the insertion opening is greater than an outer diameter of a corresponding one of the two counterpart connectors, and a difference between the inner diameter of the insertion opening and the outer diameter of the corresponding one of the two counterpart connectors is within the predetermined distance range.

* * * * *